(12) United States Patent
Hagmann

(10) Patent No.: US 9,784,375 B2
(45) Date of Patent: Oct. 10, 2017

(54) PRESSURE INDEPENDENT CONTROL VALVE

(71) Applicant: SIEMENS SCHWEIZ AG, Zurich (CH)

(72) Inventor: Stefan Hagmann, Meierskappel (CH)

(73) Assignee: Siemens Schweiz AG, Zurich (CH)

( * ) Notice: Subject to any disclaimer, the term of this patent is extended or adjusted under 35 U.S.C. 154(b) by 125 days.

(21) Appl. No.: 14/695,254

(22) Filed: Apr. 24, 2015

(65) Prior Publication Data

US 2015/0308579 A1 Oct. 29, 2015

(30) Foreign Application Priority Data

Apr. 24, 2014 (EP) .................................... 14165902

(51) Int. Cl.
*F16K 31/12* (2006.01)
*F16K 15/02* (2006.01)
*G05D 7/01* (2006.01)

(52) U.S. Cl.
CPC ........... *F16K 15/02* (2013.01); *G05D 7/0106* (2013.01); *Y10T 137/7788* (2015.04)

(58) Field of Classification Search
CPC ................................................. Y10T 37/7791
See application file for complete search history.

(56) References Cited

U.S. PATENT DOCUMENTS

| 988,495 | A | 4/1911 | Noyes |
| 3,344,805 | A | 10/1967 | Wapner |
| 5,143,116 | A | 9/1992 | Skoglund |
| 5,234,025 | A * | 8/1993 | Skoglund .............. G05D 7/0126 137/497 |
| 5,642,752 | A * | 7/1997 | Yokota ................. G05D 7/0106 137/413 |
| 5,775,369 | A | 7/1998 | Hagmann |
| 6,827,100 | B1 * | 12/2004 | Carlson ................ G05D 7/0106 137/454.6 |
| 7,128,086 | B2 | 10/2006 | Kirchner et al. |
| 2003/0084940 | A1 * | 5/2003 | Lee ....................... G05D 7/0106 137/501 |
| 2004/0261860 | A1 | 12/2004 | Kirchner et al. |
| 2005/0211305 | A1 | 9/2005 | Kirchner et al. |
| 2010/0043887 | A1 * | 2/2010 | Oddie .................. G05D 7/0106 137/12 |

FOREIGN PATENT DOCUMENTS

CN 1129974 A 8/1996
CN 103335142 A 10/2013

* cited by examiner

*Primary Examiner* — R. K. Arundale
(74) *Attorney, Agent, or Firm* — Laurence Greenberg; Werner Stemer; Ralph Locher

(57) ABSTRACT

A pressure independent control valve contains a valve body with an inlet, an outlet and a flow channel coupling the inlet to the outlet. A hollow piston is arranged in a seat in the valve body, such that the hollow piston is configured to move. The hollow piston has an enclosure, such that the pressure independent control valve maintains different fluid pressures in the flow channel and inside the hollow piston. The pressure independent control valve contains a chamber and a biasing member to urge the hollow piston towards the chamber. The chamber is in fluid communication with the inlet and with the inside of the hollow piston, such that the valve applies substantially the same pressure inside the annular channel, at the inlet and inside the hollow piston.

17 Claims, 2 Drawing Sheets

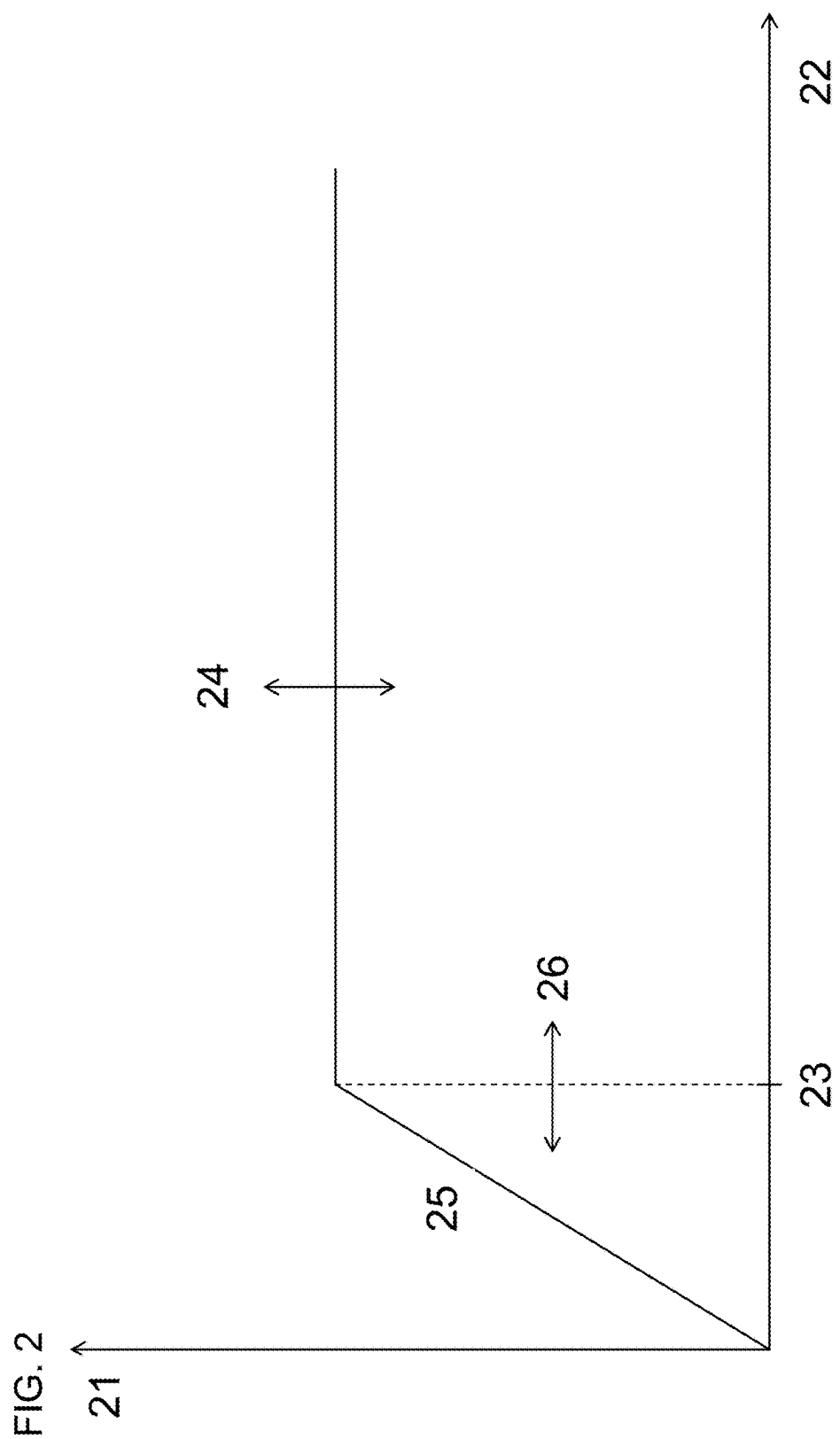

PRESSURE INDEPENDENT CONTROL VALVE

CROSS-REFERENCE TO RELATED APPLICATION

This application claims the priority, under 35 U.S.C. §119, of European application No. EP 14165902.9, filed Apr. 24, 2014; the prior application is herewith incorporated by reference in its entirety.

BACKGROUND OF THE INVENTION

Field of the Invention

The present disclosure relates to an improved control valve. The present disclosure focuses on a control valve wherein the flow of a fluid is a function of the position of a throttle. More particularly, the control valve as disclosed herein achieves a flow rate that is substantially independent of the pressure at the outlet of the valve.

Flow control valves are commonly employed in HVAC (heating, ventilation, air conditioning) systems of buildings. These systems typically circulate a fluid such as water through a plurality of conduits in order to provide heating or cooling. The purpose of a flow control valve is to achieve a controlled flow of a fluid through the conduits of the system.

The amount of water flowing through the valve is essentially governed by the position of the throttle. A separate flow meter measuring the flow of water through the HVAC system may thus be dispensed with.

The amount of delivered energy is then calculated as the throughput of the fluid multiplied with the temperature drop in the system. The flow of water is determined from the position of the throttle and the temperature drop is measured separately. In the context of HVAC systems, the amount of energy is frequently measured in kWh.

U.S. Pat. No. 7,128,086 B2 was granted in 2006 and discloses a flow control valve. The valve according to U.S. Pat. No. 7,128,086 B2 contains a hollow piston 110 movable along an axis X1. A spring 160 exerts a force on the hollow piston 110 in the direction of the same axis X1. A rolling diaphragm is arranged on one side of the piston 110. The rolling diaphragm is connected to the hollow piston 110 and separates an annular channel 109 from the inside of the hollow piston 110. The annular channel 109 is in fluid communication with the inlet 106 of the valve through a reference passageway 180. The inside of the hollow piston 110 is in fluid communication with the outlet 108 of the valve through apertures 192 of the hollow piston 110. The valve also contains a channel that circumferentially surrounds the hollow piston 110 and is in fluid communication with the flow channel 104 of the valve.

The pressure in the annular channel 109 of this arrangement is the pressure p1 at the inlet 106 of the valve. Similarly, the pressure inside the hollow piston 110 equals the pressure p3 at the outlet 108 of the valve. The pressure p2 in the chamber surrounding the hollow piston 110 is the same as the pressure inside the flow channel of the valve 104.

The hollow piston 110 may move under the influence of the pressures p1, p2, p3 and under the influence of the spring 160. As soon as the corresponding forces are balanced, the difference between the pressures p1 at the inlet and p2 inside the flow channel predominantly determines the flow rate through the valve. The influence of the pressure p3 at the outlet 108 of the valve is largely eliminated.

The arrangement as disclosed by U.S. Pat. No. 7,128,606 B2 requires an element 118 for guidance of the axial movement of the piston 110. The piston guide needs to be mounted to the valve body and a seal 130 is necessary to separate the annular channel 109 from the inside of the hollow piston 110. The seal 130 and the rolling diaphragm separate the annular channel 109 with the highest pressure p1 from the inside of the piston 110 with the lowest pressure p3. The stresses on the seal 130 and on the rolling diaphragm are particularly high along its second convolution 138. The piston 110 is movable against the guide 118. Due to the stresses on the seal 130 and on the rolling diaphragm, an adequate choice of materials for these highly stressed parts becomes challenging.

The gap in between the rim 117 of the guide 118 and the sleeve 114 of the piston 110 needs to be narrow in order to prevent transverse movement of the piston 110. Yet the fluid from the inside of the hollow piston 110 must reach the space in between the rim 117 and the second convolution 138. The second convolution 138 will otherwise not be exposed to the pressure drop between the p1 and p3. Extra design measures will be required to overcome the conflicting requirement of precise guidance through the rim 117 and of full pressure drop across the second convolution 138.

The aim of the present disclosure is at least to mitigate the aforementioned difficulties and to provide a flow control valve that meets the aforementioned requirements.

SUMMARY OF THE INVENTION

The present disclosure is based on the discovery that technical constraints on a seal adjacent to a piston can be relaxed through an adequate pressure concept. The valve disclosed herein is configured such that the pressure inside the piston is the same as the pressure of an annular channel adjacent to the piston. This measure mitigates the difficulties involved in configuring a seal in between the annular channel and the piston. Further, the pressure concept of the present disclosure avoids extra measures to ensure an even distribution of pressure around a guide element.

The above problems are resolved by a pressure independent control valve according to the main claim of this disclosure. Preferred embodiments of the present disclosure are covered by the dependent claims.

It is a related object of the present disclosure to provide a pressure independent control valve wherein friction between the movable piston and the guide element is minimized.

It is another related object of the present disclosure to provide a pressure independent control valve wherein any hysteresis affecting the movement of the piston is negligible.

It is yet another related object of the present disclosure to provide a pressure independent control valve wherein a throttle controls the fluid throughput through the valve to the point where an additional flow meter can be dispensed with.

It is another object of the present disclosure to provide a pressure independent control valve configured for measuring a temperature drop across the valve.

It is yet another object of the present disclosure to provide a heating, ventilation and air-conditioning system with a pressure independent control valve according to this disclosure.

It is another object of the present disclosure to provide a building with a heating, ventilation and air-conditioning system comprising a pressure independent control valve.

Other features which are considered as characteristic for the invention are set forth in the appended claims.

Although the invention is illustrated and described herein as embodied in a pressure independent control valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a graph showing a fluid throughput versus a pressure difference.

DETAILED DESCRIPTION OF THE INVENTION

Figure 1:
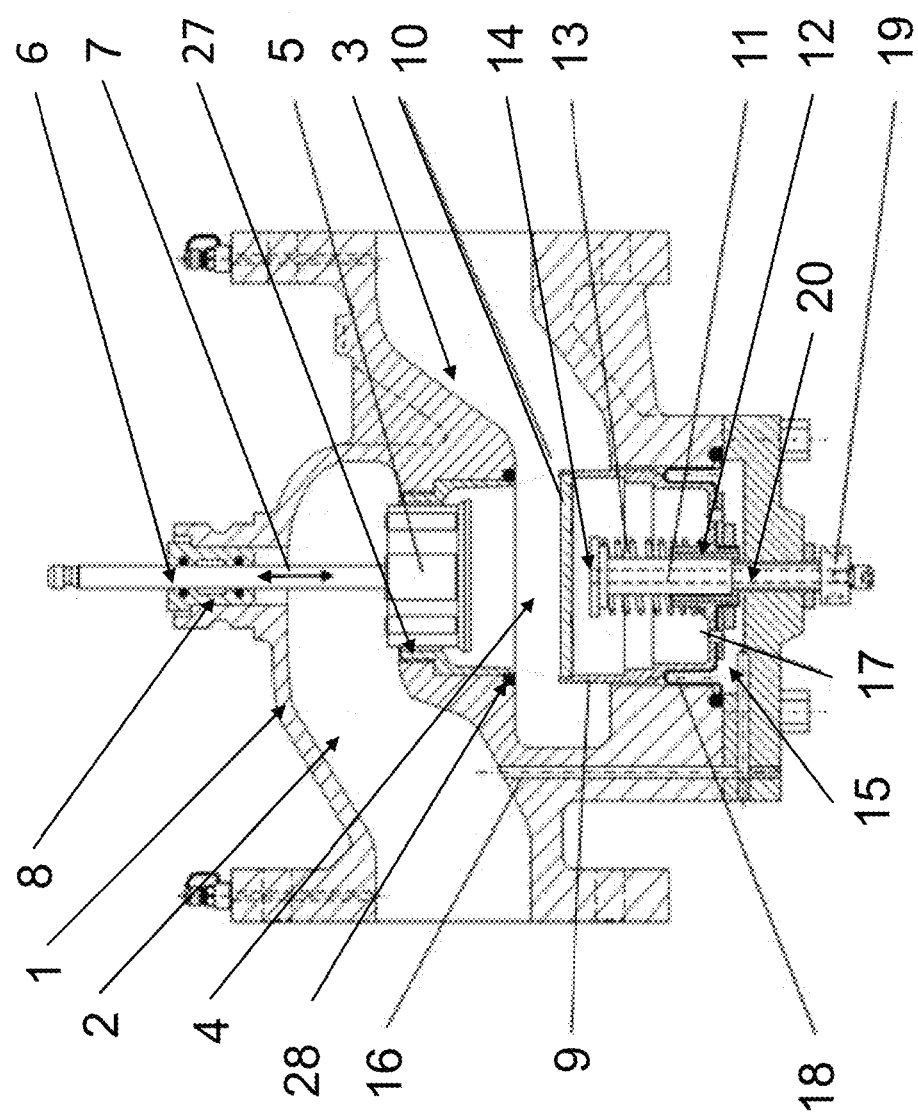
FIG. 1 is a diagrammatic, sectional view of a pressure independent control valve according to the invention.

Referring now to the figures of the drawings in detail and first, particularly to FIG. 1 thereof, there is shown various principal and optional components of a pressure independent control valve as per this disclosure.

The pressure control valve contains a valve body 1 with openings forming an inlet 2 and an outlet 3. The inlet 2 and the outlet 3 allow a flow of a fluid through the valve. In a preferred embodiment, the fluid is a liquid. In a particularly preferred embodiment, the fluid flowing through the valve is water or a mixture containing water.

A flow channel 4 is arranged along the fluid path and in between the inlet 2 and the outlet 3. At the inlet 2 of the valve, the fluid has a pressure of substantially p1. The pressure of the fluid at the outlet 3 of the valve is substantially p3. The (overall) pressure of the fluid inside the flow channel 4 substantially is p2.

A throttle 5 is movably mounted inside a seat 27 in between the inlet 2 and the flow channel 4. The position of the throttle 5 may change by moving a stem 6 back and forth along the direction indicated by arrow 7. In a particular embodiment, the stem 6 is rotatable around the axis indicated by the arrow 7. In an alternate embodiment, the stem 6 is not rotatable around the axis indicated by the arrow 7.

The throttle 5 effectively varies and limits the flow of the fluid through the pressure independent control valve. To that end, the body of the throttle 5 is permeable to the fluid.

A bearing 8 restricts the movement of the stem 6 against the valve body 1. Accordingly, the walls of the valve body surrounding the throttle 5 and the bearing 8 act as guide elements for the throttle 5.

The bearing 8 may be of the ball-bearing type and/or of the friction-bearing type. It is envisaged that the bearing 8 also seals the pressure independent control valve, so that no fluid will leak from the valve.

A hollow piston 9 is movably mounted inside another seat in the valve body 1. The hollow piston 9 has a cover 10 that is exposed to the pressure p2 in the flow channel 4. It is envisaged that the shape of the cover may be uneven or may be substantially flat. Those parts of the hollow piston 9 that are exposed to the pressure p2 inside the flow channel 4 are impermeable to fluid. Consequently, no fluid coming from the flow channel 4 will enter the hollow piston 9.

It is envisaged that the cross-section of the hollow piston 9 may be circular, oval, triangular, quadratic, rectangular. The cross-section of the hollow piston may actually have any shape 9 that technically makes sense.

Any movement of the hollow piston 9 is restricted by the seat in the valve body. Preferably, the seat for the hollow piston 9 effectively restricts the movement of the piston 9 to directions towards or away from the throttle 5. The walls of the seat may hold the hollow piston 9 either through a friction-type bearing and/or through a ball-bearing. It is envisaged that the bearing will allow essentially no fluid to flow through the passage in between the hollow piston 9 and the walls of the seat in the valve body 1. It is also envisaged that the same bearing is optimized for low friction and/or for minimum hysteresis.

The pressure independent control valve contains a further guide element 11 for the hollow piston 9. The guide element 11 is arranged opposite to a cover 10 and penetrates a bore through the hollow piston 9. The bore through the hollow piston 9 provides a sleeve 12 that is substantially parallel to the wall of the guide element 11. The sleeve 12 and the guide elements 11 essentially form a bearing. This bearing may be of the ball-bearing or of the friction bearing type. The passage between the guide element 11 and the sleeve 12 needs not be fluid-tight. It is envisaged that the bearing formed by the sleeve 12 and the guide element 11 is optimized for minimum friction and/or for minimum hysteresis.

The sleeve 12 and the guide element 11 restrict the movement of the hollow piston 9 in the same manner as the aforementioned seat in the valve body 1. It follows that technical constraints as the accuracy of guidance either through the sleeve 12 or through the seat in the valve body 1 may be relaxed to some extent.

The guide element 11 is surrounded by a biasing member 13. In a preferred embodiment, the biasing member 13 is a spring. In a yet more preferred embodiment, the biasing member 13 is a helical spring, in particular a helical compression spring. The biasing member 13 is mounted to an end 14 of the guide element 11. In a preferred embodiment, the guide element 11 provides a head 14 with a substantially flat surface that compresses the biasing member 13.

An annular channel 15, in general terms a reservoir 15, is arranged adjacent to the hollow piston 9. The annular channel 15 is in fluid communication with the inlet 2 of the pressure independent control valve through a passageway 16. The annular channel 15 is also in fluid communication with the inside of the hollow piston 9. The inside of the hollow piston 9 and the reservoir 15 in this context form a chamber. The hollow piston 9 is in general terms a displaceable element 9 or part of a displaceable element that separates the chamber from the flow channel 4. According to a particular embodiment, the displaceable element provides no holes, orifices or apertures that allow the chamber to be in fluid communication with the flow channel 4. In other words, the displaceable element provides a simply connected surface within the topological meaning of the term simply connected.

One or several apertures 17 are located in the wall of the hollow piston 9 that separates the annular channel 15 and the inside of the hollow piston 9. Since the inlet 2, the hollow piston 9, and the annular channel 15 are all in fluid communication, these parts (9, 15, 2, 16, 17) are exposed to substantially the same pressure p1.

A rolling diaphragm 18 contributes to separating the pressure p1 inside the annular channel and the pressure p2 inside the flow channel 4 of the valve. The rolling diaphragm 18 provides a seal in addition to the aforementioned bearing formed by the hollow piston 9 and the seat in the valve body 1. In a preferred embodiment, the presence of the two seals implies that the technical constraints for each of the two seals may be relaxed to some extent. If the sealing effect of the rolling diaphragm 18 is sufficient, the interface between the piston 9 and the valve body 1 may be permeable to some extent. Consequently, a ball bearing may be arranged in between the hollow piston 9 and the valve body 1. The arrangement will then experience even less friction and/or less hysteresis as the hollow piston 9 moves.

The rolling diaphragm 18 may be made of any suitable flexible material. In particular embodiments, the rolling diaphragm 18 is made of rubber and/or fabric coated rubber and/or biaxially-oriented polyethylene terephthalate (MYLAR®) and/or polyester film and/or metal foil.

During operation, the pressure p1 will exert a force to drive the hollow piston 9 towards the throttle 5. The biasing member 13 will urge the piston 9 in the opposite direction away from the throttle 5. A width of a gap between a rim 28 and (the cover 10 of) the piston 9 is thus allowed to vary to some extent. The amplitude of the movement of the hollow piston 9 depends on the pressure difference between the inlet 2 and the flow channel 4.

The position of the throttle 5 relative to its seat 27 and position of the hollow piston 9 relative to the rim 28 determine the throughput of fluid through the valve. These positions are substantially independent of outlet pressure p3, so that the valve achieves a flow rate which is essentially independent of outlet pressure p3. The same is indicated on FIG. 2, where typical fluid throughput (axis 21) is plotted versus pressure difference (axis 22). The flow of fluid is essentially constant on the right hand side of a pressure difference 23.

Preferably, the piston 9 provides a surface 10 to separate the chamber from the flow channel 4 and the same surface is larger than the corresponding surface provided by the diaphragm 18. In a yet more preferred embodiment, the area of the separating surface 10 of the piston 9 is at least twice the separating surface of the diaphragm 18. In a yet more preferred embodiment, the area of the separating surface 10 of the piston 9 is at least five times larger than the area of the separating surface of the diaphragm 18.

In a particular embodiment, the pressure independent control valve also contains an adjusting bolt 19. The adjusting bolt 19 connects to a head 14 of the guide element 11 via a telescopic stem 20. By turning the bolt 19 it is possible to adjust the position of the head 14 of the guide element 11. Since the head 14 also connects to the biasing member 13, the bolt 19 can be used to adjust the bias applied by the member 13.

The bolt 19 is employed to alter the balance between the pressure inside the piston 9, the pressure in the flow channel 4 and the force applied by the biasing member 13. An adjustment of the bias applied by the member 13 has an effect on the maximum throughput of fluid through the valve. The flow of fluid through the valve will depend on the gap between the hollow piston 9 and the rim 28. By altering the balance of pressures and forces inside the valve, this gap will also change. Consequently, an adjustment of the bias will affect the maximum flow of fluid through the pressure independent control valve. Arrow 24 on FIG. 2 indicates possible changes in the rate of fluid flow due to an adjustment of bias.

Actually, the flow of fluid through the valve is independent of outlet pressure p3 as soon as the pressure difference between input 2 and output 3 exceeds a threshold. Any difference between p1 and p2 is limited to the difference between p1 and p3. The pressure difference p1−p2 between the inlet 2 and the flow channel 4 cannot exceed that value. If the difference between p1 and p2 becomes too small, the flow of fluid through the valve will depend on the pressure difference between inlet p1 and outlet p3. FIG. 2 illustrates this regime as a line 25 with positive slope.

As soon as the pressure difference 22 reaches the onset 23 of constant flow, the throughput of fluid through the valve will essentially be independent of outlet pressure p3. By changing the position of the adjusting bolt 19, the pressure difference required to achieve constant flow will also change.

An adjustment of the onset 23 of constant flow and of maximum throughput offers distinct benefits where pressure independent control valves need be accurate within certain limits. This is often the case in applications where a control valve renders a separate flow meter obsolete. Pressure independent control valves are then required to produce constant flow over a given range of pressure differences. Constant in this context means that the flow of fluid through the valve is determined by the position of the throttle 5.

In yet another embodiment, a pressure independent control valve provides a plurality of temperature sensors to determine temperature drop. The temperature sensors can, for instance, be arranged at the inlet and/or at the outlet of the valve. This particular embodiment is particularly useful for metering.

By changing the position of an adjusting bolt 19, the onset of constant flow and hence the useful range of pressure differences of a control valves is set. Likewise, the maximum throughput of fluid through a valve will affect accuracy. Also, for a given building the maximum flow of fluid will depend on the characteristics of the HVAC system employed in that building. The adjusting bolt 19 thus allows a pressure independent control valve to be adapted to the particular HVAC system of a building.

It should be understood that the foregoing relates only to certain embodiments of the invention and that numerous changes may be made therein without departing from the spirit and the scope of the invention as defined by the following claims. It should also be understood that the invention is not restricted to the illustrated embodiments and that various modifications can be made within the scope of the following claims.

The following is a summary list of reference numerals and the corresponding structure used in the above description of the invention:

REFERENCE NUMERALS

1 valve body
2 inlet
3 outlet
4 flow channel
5 throttle
6 stem
7 arrow indicating possible movements of the stem 6
8 bearing surrounding the stem 6
9 hollow piston
10 cover
11 guide element
12 sleeve
13 bias element
14 head
15 annular channel
16 passageway
17 aperture
18 rolling diaphragm 19 adjusting bolt
20 telescopic stem
21 axis for the flow rate through the valve
22 axis for the pressure difference
23 onset of constant flow
24 variation of maximum flow
25 proportional regime of flow rate versus pressure difference
26 variation of onset of constant flow
27 seat of the throttle 5
28 rim

The invention claimed is:

1. A pressure regulated valve, comprising:
a valve body having at least one inlet, at least one outlet, at least one flow channel coupling said at least one inlet to said at least one outlet, and at least one chamber in fluid communication with said at least one inlet, the pressure regulated valve configured to apply substantially a same pressure at said at least one inlet and inside said at least one chamber;
at least one displaceable element separating said at least one chamber from said at least one flow channel, said at least one displaceable element having a flexible diaphragm connecting to said valve body, said at least one displaceable element being displaceable to increase a volume of said at least one chamber and to narrow said at least one flow channel such that said at least one displaceable element lowers a throughput of fluid through said at least one flow channel; and
at least one biasing member being disposed inside said at least one chamber, said biasing member being configured to urge said at least one displaceable element such that said at least one biasing member urges a volume of said at least one chamber to decrease and a volume of said flow channel to increase, for increasing the throughput of the fluid through said flow channel.

2. The pressure regulated valve according to claim 1, wherein said at least one displaceable element has a connected surface, said at least one displaceable element configured to separate said at least one chamber and said at least one flow channel by means of said connected surface.

3. The pressure regulated valve according to claim 1, wherein said valve body has a seat; and
further comprising at least one throttle, said at least one throttle disposed in said seat in said valve body and said seat for said at least one throttle is disposed at a distance from said at least one displaceable element.

4. The pressure regulated valve according to claim 1, wherein:
said valve body having at least one passageway formed therein; and
said at least one chamber has at least one reservoir and said at least one reservoir and said at least one inlet are in fluid communication through said at least one passageway.

5. The pressure regulated valve according to claim 1, wherein said flexible diaphragm is a flexible rolling diaphragm made of at least one of a rubber, a fabric coated rubber, a biaxially-oriented polyethylene terephthalate, polyester film or a metal foil.

6. The pressure regulated valve according to claim 5, wherein said flexible diaphragm is impermeable to a fluid flow, such that said flexible diaphragm prevents a fluid flow between said at least one chamber and said at least one flow channel.

7. The pressure regulated valve according to claim 1, wherein said valve body has a seat and said at least one displaceable element is movably disposed in said seat in said valve body.

8. The pressure regulated valve according to claim 1, further comprising a guide element, said at least one biasing member surrounds said guide element.

9. The pressure regulated valve according to claim 8, wherein said at least one displaceable element is a piston and said at least one biasing member is at least partially disposed inside said piston.

10. The pressure regulated valve according to claim 1, further comprising a bearing minimizing at least one of friction or hysteresis in between said at least one displaceable element and a corresponding seat in said valve body.

11. The pressure regulated valve according to claim 10, wherein said bearing is selected from the group consisting of a friction-type bearing and a ball-type bearing.

12. The pressure regulated valve according to claim 1, wherein:
the regulated valve is a pressure independent control valve; and
said at least one biasing member is at least one helical spring.

13. A pressure regulated valve, comprising:
a valve body having at least one passageway formed therein, at least one inlet, at least one outlet, at least one flow channel coupling said at least one inlet to said at least one outlet, and at least one chamber in fluid communication with said at least one inlet, said at least one chamber having at least one reservoir and said at least one reservoir and said inlet being in fluid communication through said at least one passageway, the pressure regulated valve configured to apply substantially a same pressure at said at least one inlet and inside said at least one chamber;
at least one displaceable element separating said at least one chamber from said at least one flow channel, said at least one displaceable element having a flexible diaphragm connecting to said valve body, said at least one displaceable element being displaceable to increase a volume of said at least one chamber and for narrowing said at least one flow channel such that said at least one displaceable element lowers a throughput of fluid through said at least one flow channel;
said at least one displaceable element having a wall separating said at least one reservoir from a remainder of said at least one chamber, said wall having at least one aperture formed therein and said at least one reservoir and said remainder of said at least one chamber being in fluid communication through said at least one aperture in said wall; and
at least one biasing member configured for urging said at least one displaceable element such that said at least one biasing member urges a volume of said at least one chamber to decrease and a volume of said at least one flow channel to increase, for increasing the throughput of the fluid through said at least one flow channel.

14. The pressure regulated valve according to claim 13, wherein said at least one biasing member is disposed inside said at least one chamber.

15. A pressure regulated valve, comprising:
a valve body having at least one inlet, at least one outlet, at least one flow channel coupling said at least one inlet to said at least one outlet, and at least one chamber in fluid communication with said at least one inlet, the pressure regulated valve configured to apply substantially a same pressure at said at least one inlet and inside said at least one chamber;

at least one displaceable element separating said at least one chamber from said at least one flow channel, said at least one displaceable element having a flexible diaphragm connecting to said valve body, said at least one displaceable element being displaceable to increase a volume of said at least one chamber and to narrow said at least one flow channel such that said at least one displaceable element lowers a throughput of fluid through said at least one flow channel;

at least one biasing member configured for urging said at least one displaceable element such that said at least one biasing member urges a volume of said at least one chamber to decrease and a volume of said flow channel to increase, for increasing the throughput of the fluid through said flow channel;

a guide element, said at least one biasing member surrounding said guide element;

an adjusting bolt; and a telescopic stem connected to said guide element, said telescopic stem further connected to said valve body through said adjusting bolt.

16. The pressure regulated valve according to claim 15, wherein said at least one biasing member is fixated to said guide element, such that said telescopic stem is configured to modify a bias applied to said at least one biasing member by adjusting said adjusting bolt.

17. A heating, air-conditioning, ventilation system, comprising:

a pressure regulated valve according to claim 1.

* * * * *